Dec. 23, 1941.    C. A. BURROUGHS    2,267,492
LAWN SPRINKLER VALVE
Filed Sept. 3, 1940    6 Sheets-Sheet 1

Inventor
Clarence A. Burroughs
By Lacey & Lacey, Attorneys

Dec. 23, 1941.   C. A. BURROUGHS   2,267,492
LAWN SPRINKLER VALVE
Filed Sept. 3, 1940   6 Sheets-Sheet 2

Inventor
Clarence A. Burroughs
By Lacey & Lacey, Attorneys

Dec. 23, 1941.  C. A. BURROUGHS  2,267,492
LAWN SPRINKLER VALVE
Filed Sept. 3, 1940  6 Sheets-Sheet 6

Inventor
Clarence A. Burroughs
By Lacey & Lacey, Attorneys

Patented Dec. 23, 1941

2,267,492

UNITED STATES PATENT OFFICE 2,267,492

LAWN SPRINKLER VALVE

Clarence A. Burroughs, Sacramento, Calif.

Application September 3, 1940, Serial No. 355,221

5 Claims. (Cl. 137—139)

This invention relates to a lawn sprinkler valve which is an improvement over that shown in my pending application, Serial No. 232,671, filed September 30, 1938, now Patent No. 2,224,508, of December 10, 1940.

One object of the invention is to provide a lawn sprinkler valve which will be operable, when installed in a lawn watering system or between a water pipe and a sprinkler nozzle, for automatically shutting off flow of water to the nozzle after the passage of a predetermined length of time.

Another object of the invention is to provide a lawn sprinkler valve which is of much more simple construction than the valve disclosed in my pending application above mentioned.

A further object of the invention is to provide a valve of this character which will be extremely rugged in construction and highly effective in use.

A further object of the invention is to provide a lawn sprinkler valve so constructed that it lends itself readily for use in a sprinkler system consisting of a series of sprinklers, with the result that said sprinklers may be successively set in operation, which is to say that one sprinkler will be operated for a predetermined length of time and then automatically shut off at the end of said predetermined time period for delivering water to the next succeeding sprinkler, and so on until all of the sprinklers have been operated, when water flow will be automatically shut off.

A further object of the invention is to provide, in a lawn sprinkler valve, improved controlling mechanism which is of simpler construction than that shown in my pending application above referred to.

Other and incidental objects of the invention, not mentioned hereinbefore, will become apparent during the course of the following description.

Figure 2:
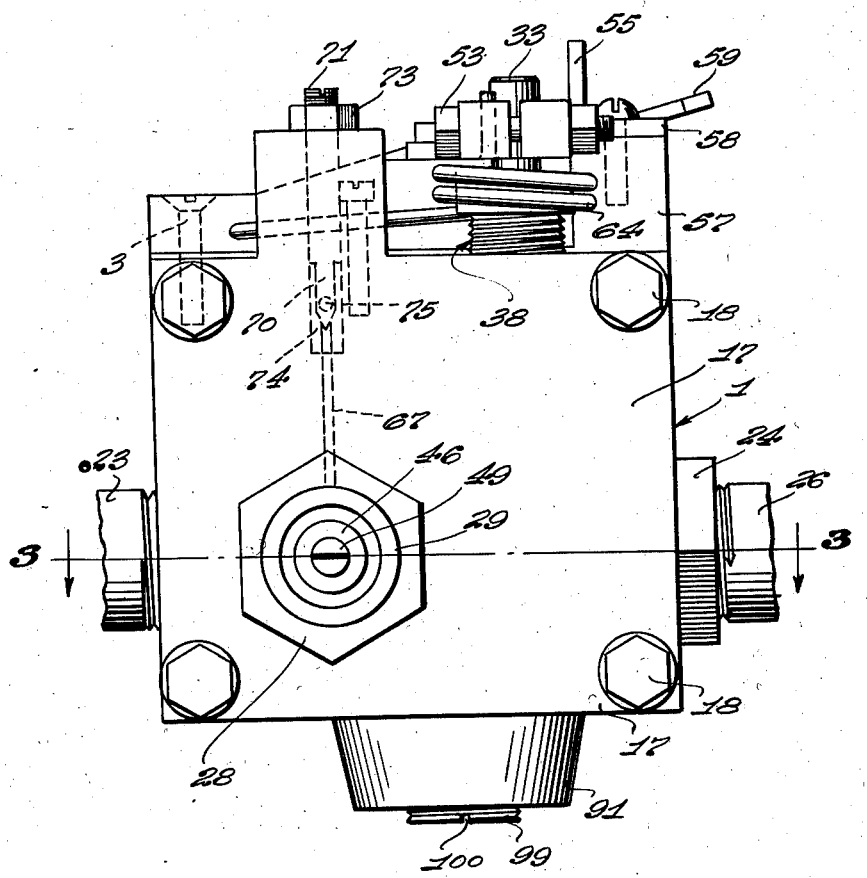
Figure 2 is an end elevation of the device.
Figure 3:
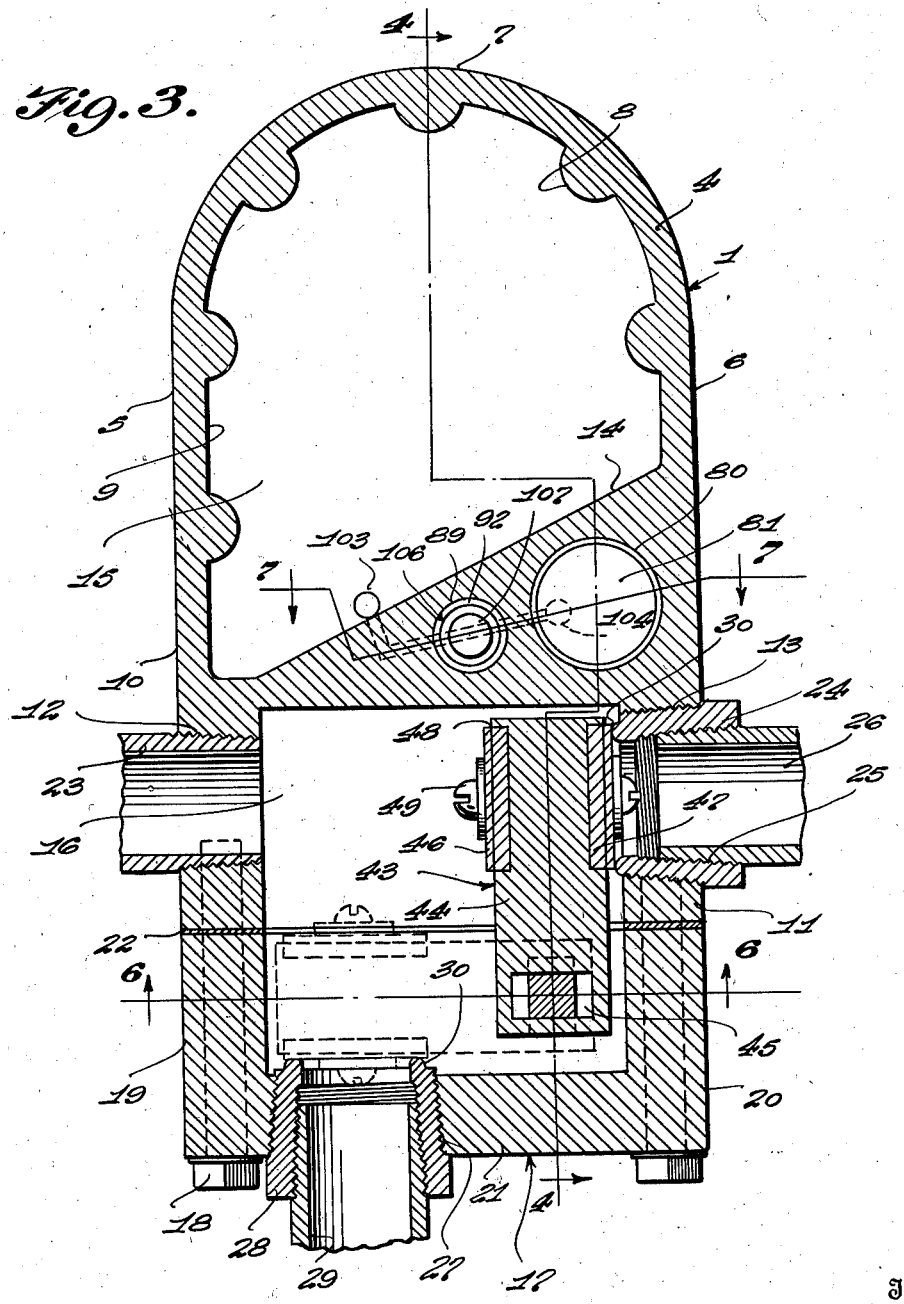
Figure 4:
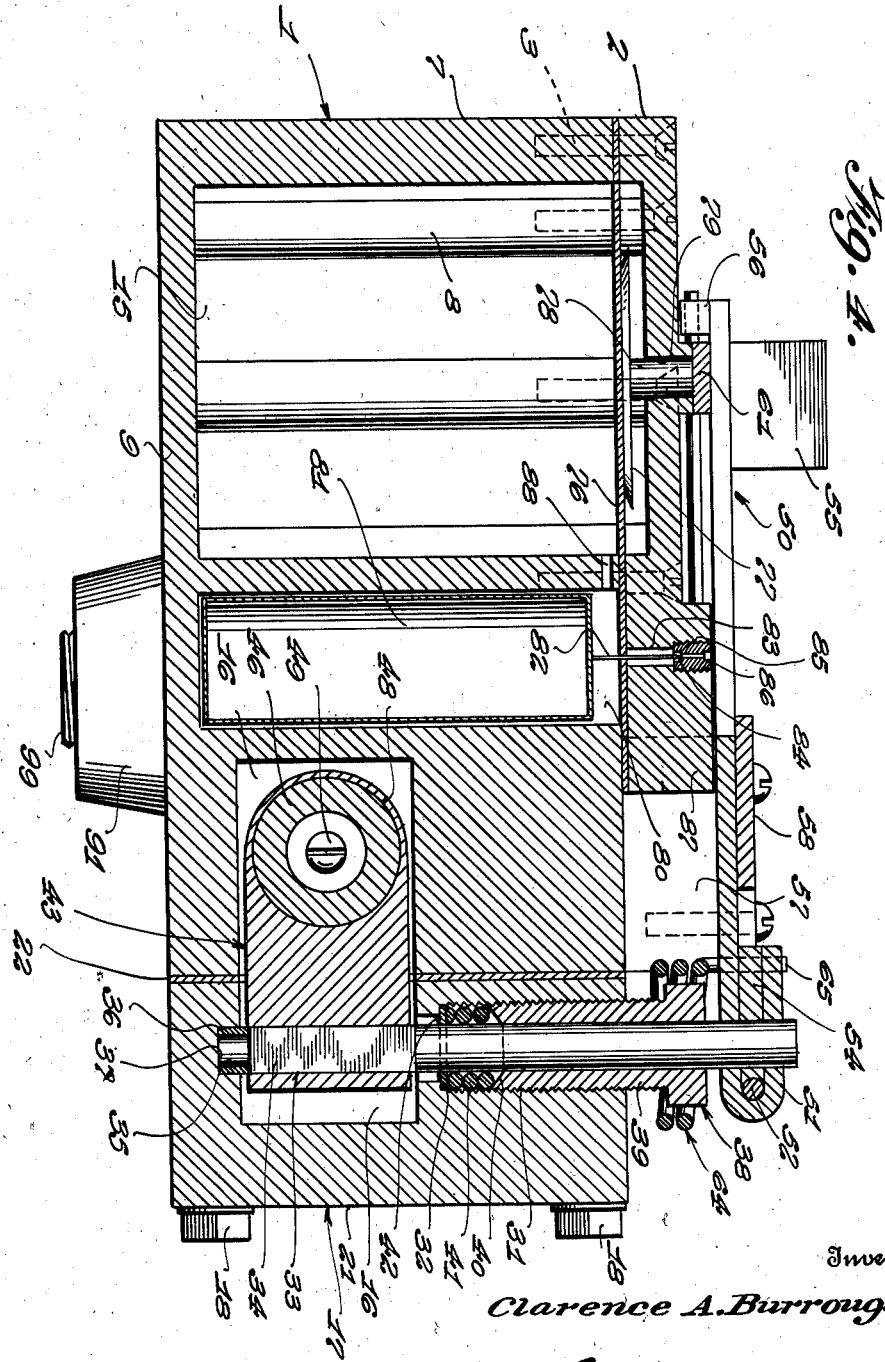
Figure 5:
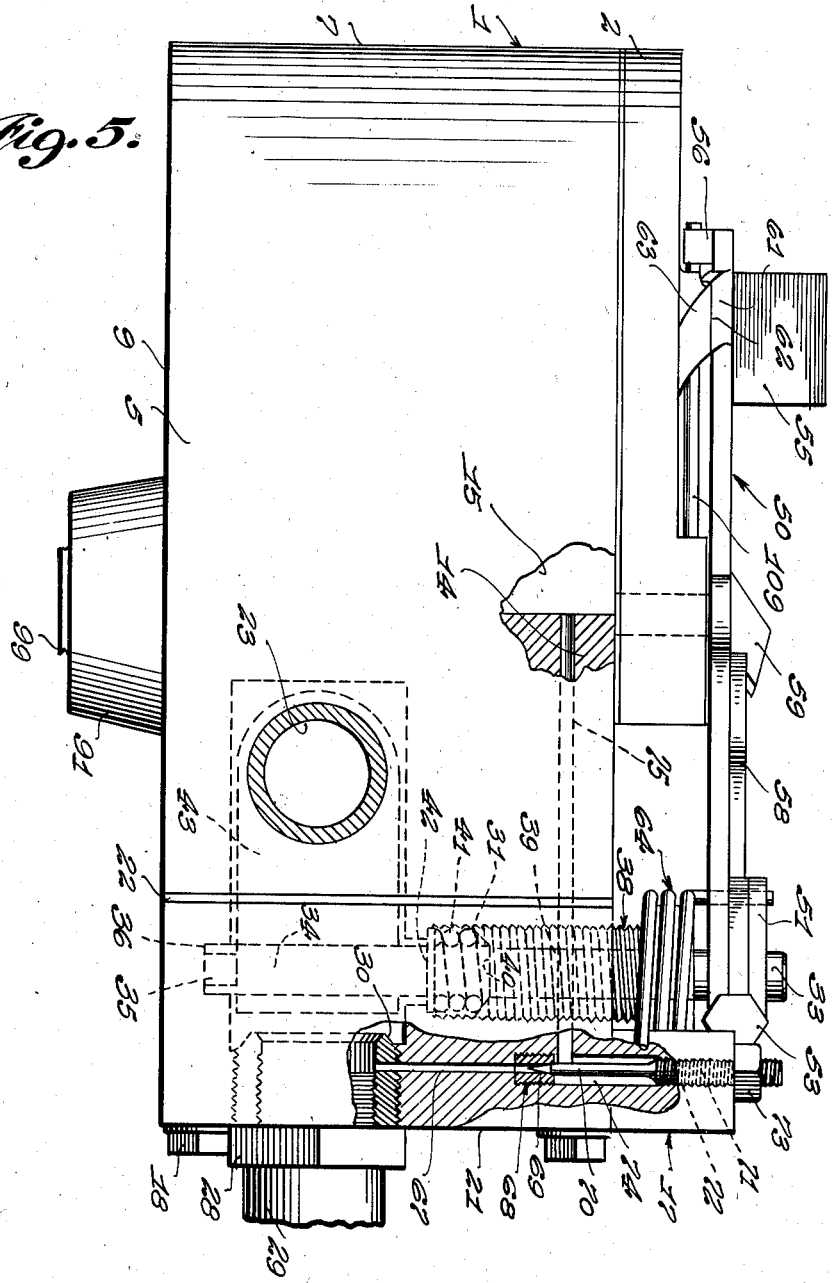
Figure 6:
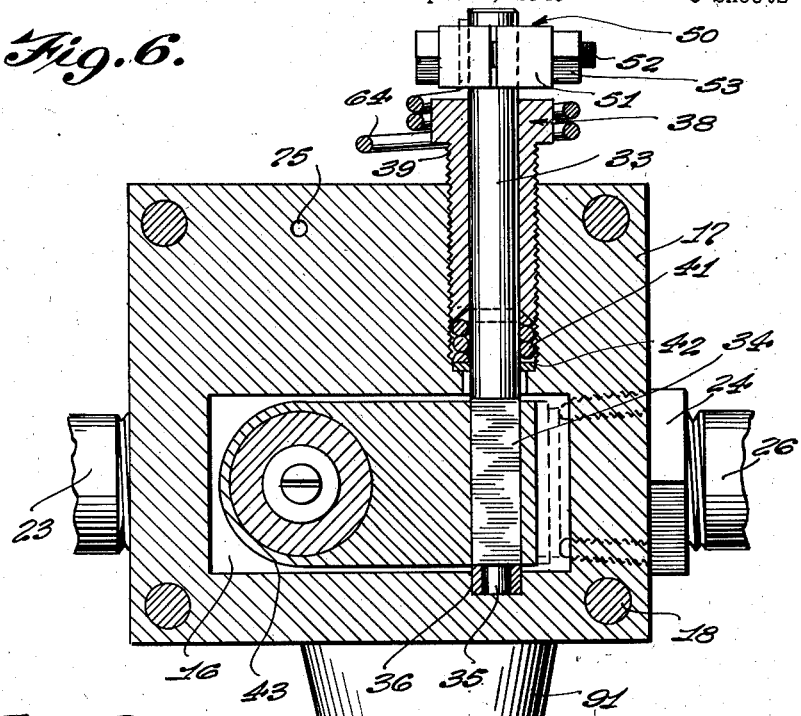
Figure 7:
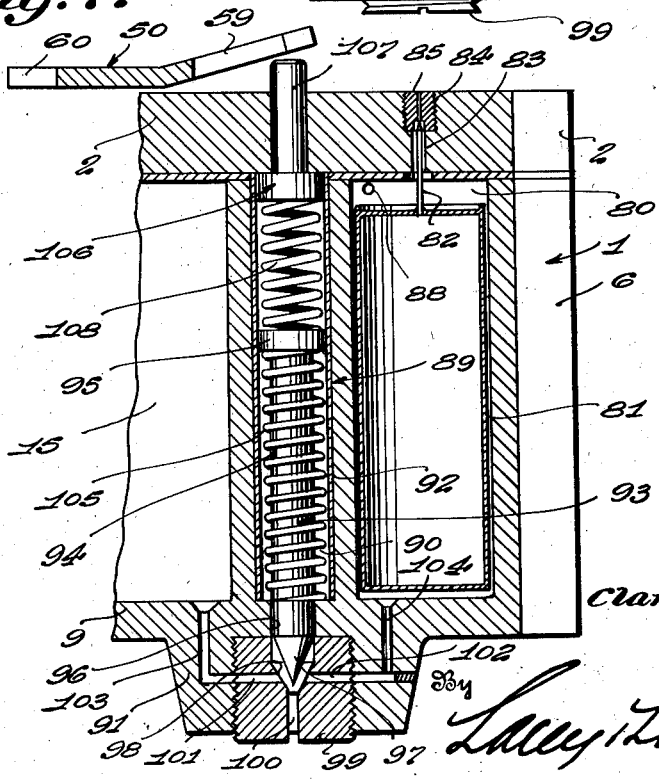

Figure 3 is a horizontal sectional view on the line 3—3 of Figure 2 looking in the direction indicated by the arrows, Figure 4 is a vertical sectional view on the line 4—4 of Figure 2, Figure 5 is a front elevation of the improved lawn sprinkler valve, Figure 6 is a vertical detail sectional view on the line 6—6 of Figure 2, and Figure 7 is an enlarged detail vertical sectional view on the line 7—7 of Figure 2.

Figure 1:
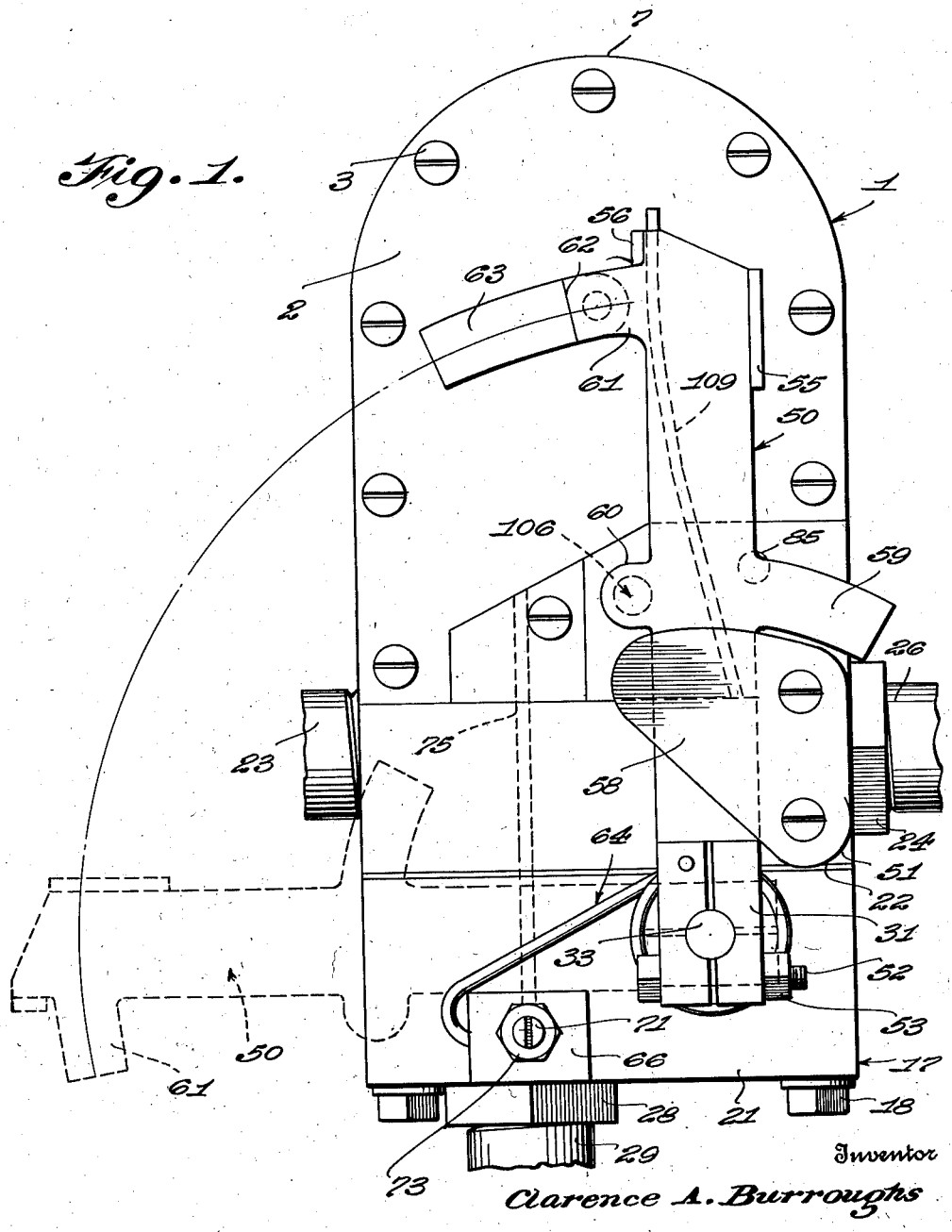
Figure 1 is a top plan view of my improved lawn sprinkler valve.

Referring now more particularly to the drawings and, for the present, to Figures 1 and 3 thereof, the numeral 1 indicates in general the body of my improved lawn sprinkler valve. The body 1 is preferably formed of heavy cast metal and is closed at its upper end by a removable top wall 2, said top wall being held in place by means of screws 3 which extend into the wall 4 of the body. As will be seen, the wall 4 is of substantially U-shape and includes straight side portions 5 and 6 and a semi-circular end portion 7. The wall 4 is formed with inwardly projecting spaced projections 8 which are recessed at their corresponding upper ends to receive the screws 3, the projections, of course, providing reinforcement for said wall.

The body 1 is closed at its lower end by a bottom wall 9. The portions 5 and 6 are thickened, as shown at 10 and 11, respectively, and said thickened portions 10 and 11 are formed with internally threaded openings 12 and 13. The body 1 is provided with an intermediate thickened section 14 which is, of course, integral and which is substantially triangular in shape. The intermediate section cooperates with the wall 4 for defining a water chamber 15, the purpose for which will be explained in more detail hereinafter. The intermediate section also cooperates with the thickened portions 10 and 11 for defining substantially half of a valve chamber 16, the remaining half of said valve chamber being defined by a hollow end section 17 which is rigidly mounted on the body by means of bolts 18 which extend longitudinally of the side walls 19 and 20 of the hollow end section 17. The end section 17 is also provided with an end wall 21. In order to insure against leakage between the body 1 and the end section 17, I provide a gasket 22.

Normally screwed into the opening 12 and having its inner end communicating with the valve chamber 16 is an inlet pipe 23, said inlet pipe having its opposite end normally connected with a source of water under pressure. Screwed into the opening 13 in the thickened portion 11 is a combined bushing and valve seat 24 which is preferably formed of semi-resilient material and which is internally threaded, as shown at 25, to receive the end of an outlet pipe 26, said outlet pipe being connected with a succeeding lawn sprinkler valve or, if none exists, being closed at its free end by means of a suitable plug. It should, of course, be understood that, where no succeeding sprinkler valves are employed, the pipe 26 will be entirely supplanted by the plug mentioned.

The end wall 21 of the section 17 is formed with an opening 27 which is internally threaded to receive a combined bushing and valve seat 28 which is similar to the combined bushing and valve seat 24. The combined bushing and valve seat 28 is internally threaded to receive the inner end of an outlet pipe 29 which has its opposite end connected with a lawn sprinkler. As will be seen, the combined bushings and valve seats 25 and 28 communicate with the interior of the valve chamber 16 and, are each provided with seat members 30 which project a slight distance within said chamber.

As will be seen by referring particularly to Figure 4 of the drawings, the end section 17 is formed with a bore 31 which communicates between the upper surface of said end section and the valve chamber 16, said bore being internally threaded throughout substantially half its length and being reduced to define a shoulder 32. Extending downwardly to the bore 31 and through the valve chamber 16 is a valve stem 33, said valve stem having a squared lower end portion 34, and said valve stem being reduced below said lower end portion to define a trunnion 35 which is journaled in a bushing 36, said bushing being mounted in a socket 37 which is in vertical alinement with the axis of the bore 31.

In order to mount the valve stem axially with respect to the bore 31, I provide a gland 38 which is formed with a threaded shank 39, said shank being normally screwed into the bore 31. As will be observed, the shank is not threaded throughout its length, the lower end portion thereof being free from threads. The gland is, however, formed with a concaved lower end 40 which is normally engageable with packing 41, said packing surrounding the stem 33, above the squared portion 34. The gland is rotatable for compressing the packing against the stem and against a stop washer 42 which lies in the bore 31 adjacent the shoulder 32. It will now be seen that there will be no possibility of leakage from the chamber 16 upwardly along the stem 33.

The valve member for controlling flow through the pipes 26 and 29 will now be described. This valve member is indicated generally at 43 and includes a shank 44 which is formed, at one end, with an oblong rectangular opening 45 which receives the squared portion 34 of the valve stem 33 therethrough. It will be seen that the oblong rectangular opening is of greater length than the thickness of the squared portion with the result that the valve member 43 may shift laterally with respect to the valve stem.

Mounted on opposite sides of the shank 44 are valve elements 46 and 47, said valve elements being of circular configuration and being formed of relatively soft material. The valve elements are mounted in recesses 48 and are held in position in said recesses by screws 49.

It will now be understood that, when the valve stem 33 is moved to one extreme position, the valve member 43 will be located with the valve element 47 in engagement with the valve seat 30 on the combined bushing and valve seat 24. In view of the fact that the elongated rectangular opening is provided, the valve member may shift laterally to a slight degree to assure an effective seating engagement with said seat member 30. When the valve stem is moved to its other extreme position, as shown in dotted lines in Figure 3, the valve member will be disposed for positioning the valve element 46 in engagement with the seat member 30 of the combined bushing and valve seat 28. The elongated rectangular opening 45 will, of course, cooperate with the valve stem for permitting most effective seating of the valve element 46.

For shifting the valve stem 33, I employ a lever, which is indicated generally at 50. The lever 50 is formed of strap metal of sufficient thickness to assure normal rigidity but not of too great thickness to prevent a slight measure of resiliency. The inner end of the lever is turned upon itself and split to define an attaching hub 51 which receives the upper end of the stem 33. A bolt 52, with cooperating nut 53 thereon, extends transversely of the plug and urges the split portions toward each other for tightly clamping the lever in position on the upper end portion of the stem. A spacer 54 is placed beneath the overlapping end of the hub 51 and also surrounds the stem, said spacer preventing collapse of the operating lug. Formed on the opposite end of the lever 50 along the portion of its forward edge is an upstanding ear 55 for manual engagement. The lever 50 is also provided, at its extreme end portion and near the ear 55 with a depending lug 56, the purpose for which will be described in more detail hereinafter. In order to assure that the lever will be prevented from swinging too far rearwardly, I provide a stop 57 on which is mounted a guide plate 58, said guide plate extending forwardly above the lever near the hub 51 and serving the purpose of limiting said lever against too great upward shifting movement. The guide plate will, of course, assure that the lever will be moved for positioning the valve member properly with respect to the combined bushing and valve seat 24. As best seen in Figures 1, 5 and 7 of the drawings, the lever 50 is formed, substantially medially of its length, with an arcuate and slightly upwardly inclined cam member 59. A projection 60 is formed on the opposite edge of the lever opposite the inner end of said cam member. The purpose of the cam member 59 and projection 60 will be brought out in more detail hereinafter. An actuating lug or dog 61 is formed on the forward edge of the lever 50, which is to say the same edge on which the projection 60 is formed, said actuating lug or dog 61 being of arcuate shape and being downwardly inclined toward its free end for engagement behind the shoulder 62 which is located at the rear end of a cam 63, said cam being integral with the top wall 2 and being arcuate in shape. It will now be understood that, when the lever 50 is shifted from the position shown in dotted lines in Figure 1 to that shown in full lines in said figure, the actuating lug will ride over the face of the cam 63 and will, when the lever is in rearmost position, seat with the end of said lug against the shoulder 62. A heavy coiled spring 64 surrounds the upper end of the packing gland 38 and has one end portion 65 extending upwardly into the hub and the other end portion extended to engage in a valve block 66 which is mounted on the top wall of the end section 17. The spring 64 is tensioned for urging the lever in a forward direction so that, when said lever 50 is free, it will be moved to the position shown in dotted lines in Figure 1.

Formed in the end wall 21 of the end section 17 is a passage 67 which communicates between the mouth of the combined bushing and valve seat 28 and a control valve 68, said control valve including a valve seat 69 and a valve stem 70, said valve stem having an enlarged threaded upper end 71 which is mounted in a threaded bore 72 in the valve block 66. The threaded portion 72 of the valve stem projects above the block and has a lock nut 73 thereon for locking the valve stem 70 in a set position with respect to the valve seat 69. A screw-driver slot is provided for the upper end of the portion 72 from the valve stem 70.

The valve seat 69 of the control valve 68 and the stem 70 are mounted within a bore 74, and leading from said bore to the interior of the chamber 15 is a passage 75. The control valve 68 will effectively control flow of water through the bore 67 and passage 75 into the water chamber 15.

Mounted in the water chamber 15 at the upper end thereof is a diaphragm 76, said diaphragm being of resilient material and being extended at its edges to form a gasket for providing a tight seal between the top wall 2 and the body 1. The diaphragm has an operating disk 77 mounted on its upper surface and this operating disk carries an operating plunger 78 which is slidably mounted in an opening 79 in the top wall 2. It will now be understood that upward movement of the diaphragm will cause upward movement of the disk and consequent upward shifting of the plunger 78. This upward movement of the plunger will cause said plunger to impinge against the under surface of the actuating lug 61 with the result that said actuating lug will be shifted upwardly to the extent that it will be freed from behind the shoulder 62. When this takes place, the spring 64 will cause the lever 50 to be swung forwardly to the position shown in dotted lines in Figure 1. A more complete operation of this mechanism will be set forth hereinafter.

A float chamber 80 is formed in the intermediate section 14 near the wall portion 6, said float chamber 80 being closed at its lower end by the bottom wall 9 of the body and said chamber being open at the upper end of the body. Loosely mounted in the chamber 80 is a float 81 which is provided with an axially mounted upwardly extending float valve 82, said float valve extending within a bore 83 and having a valve element 84 which is engageable in a valve seat 85 which is formed in the lower end of a valve plug 86, said valve plug being screwed into a thickened portion 87 of the top wall 2. A port 88 communicates between the upper end of the float chamber 80 and the water chamber 15, said port being disposed directly beneath the diaphragm 76.

Also mounted within the intermediate section 14 is a drain valve unit, which is indicated generally at 89. The drain valve unit is shown in enlarged detail in Figure 7 of the drawings and, by referring to this figure, it will be seen that said drain valve unit 89 is mounted in a vertically extending bore 90 in the intermediate section 14, said bore extending throughout the entire height of the body proper and being closed by the bottom wall 2 which bottom wall is formed, beneath the unit 89, with a boss 91. A sleeve 92, of non-corrodible material, is fitted within the bore 90 and extends throughout the entire length of said bore. Mounted in the bore 90 is a needle valve member 93, said valve member having a shank 94 and a head 95. The lower end of the valve projects through an opening 96 in the bottom wall 2 and has a valve face 97 which engages in a valve seat 98, said valve seat being formed in a valve plug 99 which is screwed axially into the boss 91. A discharge port 100 leads from the valve seat to the exterior of the plug 99, while inlet ports 101 and 102 lead from the valve seat and communicate with ports 103 and 104 respectively, said port 103 communicating with the interior of the chamber 15 and said port 104 communicating with the interior of the float chamber 80. A spring 105 surrounds the valve stem and is confined between the head 95 and the lower end of the bore 90. The spring normally urges the valve member so that the valve face will be moved out of engagement with the seat 98. Attention is called to the fact that the spring 105 is of relatively light construction. Slidably mounted in the bore 90 at its upper end is an operating plunger 106, said plunger having a stem 107 extending upwardly through the upper wall 2. A spring 108 of relatively heavy construction is disposed in the bore between the head 95 and the head 106. As will be seen by referring to Figure 1 of the drawings, the stem 107 is presented for engagement by the cam member 59. Depression of the head 106 will cause depression of the head 95, and due to the fact that the spring 108 is of heavier construction than the spring 105, the needle valve member 93 will be forced into tight seating engagement in the valve seat 98. Of course, when pressure is released from the upper end of the stem 107, the spring 105 will urge the spring 108 and head 106 upwardly.

In order to aid the spring 64 in shifting the valve member 43, which aid will be desirable when shifting said valve member against water pressure, I provide a helper spring 109, said helper spring having one end anchored in the thickened portion 87 of the top wall 2 and the other end engageable with the lug 56, when the lever is in cocked position, as shown in full lines in Figure 1.

The operation of my improved lawn sprinkler valve will now be described. The device is first made ready for use by connecting the pipe 23 with a suitable source of water under pressure. Before the water is turned on, the lever 50 is swung, against the tension of the spring 64, to the position shown in full lines in Figure 1. When moving to this position, the actuating lug 61 will move over the face of the cam 63 and will seat behind the shoulder 62. In this position, the actuating lug will overlie the plunger 78 and, also, the lug 56 will engage the end of the helper spring for placing said helper spring under tension. As has been pointed out hereinbefore, the ear 55 lends itself readily for manual engagement so that the lever may be swung with the utmost ease. Swinging of the lever to cocked position will also have the effect of moving the stem 107 from the head 106 downwardly for moving the needle valve stem downwardly for seating the valve face 97 tightly in the valve seat 98. As has been explained, the stem 107 is moved by the cam member 59. When the needle valve member is in closed position, the passages 103 and 104 are cut off from the discharge passage 100, so that fluid flow through the passages 100, 103 and 104 will be cut off.

The water is then turned on and said water will flow through the pipe 23 into the valve chamber 16 and through the pipe 29 to a sprinkler connected therewith. This is true, of course, because the valve member 43 is in the position shown in Figure 3, which is to say, that the valve element 47 is in engagement with the seat member 30 of the combined bushing and seat 24 for cutting off fluid flow through the pipe 26. Water will also flow upwardly through the bore 67 and past the control valve 68, it being understood that said control valve is partially opened, and through the passage 75 into the water chamber 15. In this connection it is desired to point out that the amount of flow of water through the passage 75 is controlled by the position of the valve 68. In this way, the length of time for filling the chamber 15 may thus be predetermined. As the chamber 15 is filling with water, air will escape through the port 88 and upwardly past the valve 84 and through the plug 86. By virtue of this construction, air pressure, caused by rising water in the chamber 15, will not shift the diaphragm 76. When the chamber is filled with water, however, said water will overflow through the port 88 into the float chamber 80. As the water rises in the chamber, it will cause the float to rise for seating the valve 84 in the valve seat 85. This will prevent escape of either water or air, with the result that further flow of water into the chamber through the passage 75 will cause upward movement of the diaphragm 76. Said upward movement will shift the disk 77 and the plunger 78 upwardly with the result that said plunger will urge the actuating lug 61 upwardly to the extent that the end thereof will clear the shoulder 62 of the cam 63. The spring 64, with the aid of the helper spring 109 will quickly swing the lever from the position shown in full lines in Figure 1 to that shown in dotted lines in said figure. This action will shift the valve member 43, within the valve chamber 16, to the position shown in full lines in Figure 3 to that shown in dotted lines in said figure. That is, to a position with the valve element 46 in closing relation to the seat 39 of the bushing and valve seat 28. Fluid flow will thus be prevented from passing through the pipe 29, and will be allowed to pass through the pipe 26 to another sprinkler or to another sprinkler valve, which would be identical with the valve under discussion. If there are no additional sprinklers, a plug would be screwed into the combined bushing and valve seat 24, with the result that complete water flow would be stopped.

As the lever 50 is shifted by action of the springs, the projection 60 and cam element 59 are displaced from above the upper end of the stem 107 of the plunger 106. The result of removal of the projection and cam element above mentioned will be that the spring 105 will be permitted to shift the needle valve element 93 upwardly for permitting draining of the chamber 15 and the float chamber 80, through the passages 100, 103 and 104. This drainage is, of course, necessary in order to place the device in a condition ready for further use, when the lever is again moved to cocked position.

It is believed that the construction and operation of my improved lawn sprinkler valve will now be thoroughly understood. In view of this fact, it is thought that further description is unnecessary.

Having thus described the invention, what is claimed as new is:

1. In a valve of the class described, a body having a water chamber, an end section connected with the body and cooperating therewith to define a valve chamber, an intermediate section defined between the chambers, said valve chamber having an inlet pipe and a pair of outlet pipes, a valve member movable in the valve chamber, a valve stem on the valve member, a lever connected with the valve stem and having a hub, a spring about the hub and normally urging the lever to released position for disposing the valve member to close one of the outlet pipes whereby water will flow through the chamber and through the other of said pipes, an outlet for the water chamber, means for closing the outlet upon shifting of the lever to a cocked position, said valve member being positioned to confront the other of the inlet pipes for diverting flow within the valve chamber, means for releasably retaining the lever in cocked position, means for permitting flow of water between the chambers, pressure actuated means within the water chamber and operable for displacing the lever from behind the retaining means whereby said spring will be operable for shifting the lever and thus shifting the valve member for again diverting water flow within the valve chamber, and means carried by the intermediate section and operable for preventing the building up of air pressure within the water chamber, said outlet closing means being released by movement of the lever to released position for permitting draining of the water chamber.

2. In a valve of the class described, a body having a water chamber, an end section connected with the body and cooperating therewith to define a valve chamber, an intermediate section defined between the chambers, said valve chamber having an inlet pipe and a pair of outlet pipes, a valve member movable in the valve chamber, a valve stem on the valve member, a lever connected with the valve stem and having a hub, a spring about the hub and normally urging the lever to released position for disposing the valve member to close one of the outlet pipes whereby water will flow through the chamber and through the other of said pipes, an outlet for the water chamber, means for closing the outlet upon shifting of the lever to a cocked position, said valve member being positioned to confront the other of the inlet pipes for diverting flow within the valve chamber, means for releasably retaining the lever in cocked position, means for permitting flow of water between the chambers, pressure actuated means within the water chamber and operable for displacing the lever from behind the retaining means whereby said spring will be operable for shifting the lever and thus shifting the valve member for again diverting water flow within the valve chamber, and means carried by the intermediate section and operable for preventing the building up of air pressure within the water chamber, said outlet closing means being released by movement of the lever to released position for permitting draining of the water chamber, said air pressure preventing means including a float chamber in the intermediate portion, a float loosely mounted in the chamber, and a valve closed by the float upon overflowing of water into the float chamber from the water chamber.

3. In a device of the class described, a body having a water chamber and an intermediate portion, said body having a boss beneath the intermediate portion, a bore in the intermediate portion, a plug screwed into the boss and having a valve seat, a passage communicating between the water chamber and the valve seat, a float chamber in the intermediate portion, said chamber having an air outlet opening, a valve plug in the opening, a passage communicating between the float chamber and the valve seat, a float in the float chamber and having a float valve engageable in the valve plug, a discharge passage communicating between the valve seat and the exterior of the plug, and a needle valve stem in the bore and movable into and out of engagement with the valve seat.

4. In a device of the class described, a body having a water chamber and a valve chamber, said chambers defining an intermediate portion, a float chamber in the intermediate portion, a port communicating between the water chamber and the float chamber, a float in the float chamber and having a valve, and a valve plug carried by the body above the float valve, said port providing an escape for air rising within the water chamber upon rising of water therein and said float closing the float valve upon overflowing of water into the float chamber.

5. In a device of the class described, a body having a water chamber and an intermediate portion, a float chamber in the intermediate portion, a port communicating between the water chamber and float chamber, a bore in the intermediate portion, a float valve operable by the float, a plug in the body beneath the bore and having a valve seat communicating with said bore, passages communicating between the chambers and the valve seat, a discharge passage communicating between the valve seat and the exterior of the plug, and a needle valve stem in the bore and movable from a position sealing the passages for retaining water in the chambers to a position opening said passages for permitting drainage of said chambers.

CLARENCE A. BURROUGHS.